(12) United States Patent
Adachi et al.

(10) Patent No.: US 6,430,491 B1
(45) Date of Patent: Aug. 6, 2002

(54) SPEED RATIO CONTROL SYSTEM OF CONTINUOUSLY VARIABLE TRANSMISSION

(75) Inventors: Kazutaka Adachi, Yokohama; Yutaka Kaneko, Zama; Hiroyuki Ashizawa, Fuzisawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/622,023

(22) PCT Filed: Dec. 21, 1999

(86) PCT No.: PCT/JP99/07181

§ 371 (c)(1),
(2), (4) Date: Aug. 11, 2000

(87) PCT Pub. No.: WO00/37833

PCT Pub. Date: Jun. 29, 2000

(30) Foreign Application Priority Data

Dec. 21, 1998 (JP) .............................. 10-362403
Dec. 13, 1999 (JP) .......................... 11-353135

(51) Int. Cl.⁷ ............................ F16H 61/02; G06F 7/00
(52) U.S. Cl. .............................. 701/51; 701/61; 477/46
(58) Field of Search ............................ 701/51, 54, 55, 701/56, 60, 61, 64; 477/46, 43, 111

(56) References Cited

U.S. PATENT DOCUMENTS 5,788,599 A * 8/1998 Adachi et al. ................ 477/45

FOREIGN PATENT DOCUMENTS

| JP | 8-296708 | 11/1996 |
| JP | 8-338515 | 12/1996 |
| JP | 9-210158 | 8/1997 |
| JP | 11-294573 | 10/1999 |

* cited by examiner

*Primary Examiner*—Tan Nguyen
(74) *Attorney, Agent, or Firm*—Foley & Lardner

(57) ABSTRACT

A control unit of a continuously variable transmission computes a speed ratio command value based on a final target ratio, a time constant representing a predetermined dynamic characteristic and a time constant representing an estimated dynamic characteristic of the transmission so that a real speed ratio approaches the final target ratio according to a running state under the predetermined dynamic characteristic. A transient target ratio is computed based on the final target ratio and time constant representing the predetermined dynamic characteristic, a correction amount of the speed ratio command value is computed based on the difference between the transient target ratio and real speed ratio, and the transmission is controlled based on the speed ratio command value after correction by this correction amount. In this way, the difference between the transient target ratio and real speed ratio is reduced and a desired speed ratio response is obtained even when the operation of a speed ratio mechanism is limited and the real speed ratio has shifted from the transient target ratio.

17 Claims, 15 Drawing Sheets

SPEED RATIO CONTROL SYSTEM OF CONTINUOUSLY VARIABLE TRANSMISSION

FIELD OF THE INVENTION

The present invention relates to the speed ratio control of a continuously variable transmission.

BACKGROUND OF THE INVENTION

Tokkai Hei 8-296708 published by the Japanese Patent Office in 1996 discloses a speed ratio control system of a continuously variable transmission (CVT) wherein the groove width of a belt pulley is varied by driving a speed ratio control valve using a step motor, and the speed ratio is made to follow a target speed ratio (transient target ratio) with a dynamic characteristic desired by the designer.

This system comprises a dynamic characteristic compensator which computes a speed ratio command value so that a speed ratio response intended by the designer is achieved, and a disturbance compensator which eliminates variation of the dynamic characteristic of the CVT and disturbances. This arrangement realizes the speed ratio response intended by the designer, and increases the stability of the CVT to dynamic characteristic variations or disturbances.

However, as the dynamic characteristic compensator is a feed forward compensator, impairment of speed change performance due to the drive speed limit of the step motor (hardware or software limiter) or the angular position limit (hardware stopper) cannot be prevented.

Although the disturbance compensator is provided, this is intended to compensate for disturbances such as parameter variations due to oil deterioration or manufacturing discrepancies (variation of time constant, i.e., response variation). The disturbance compensator cannot provide compensation when the operation of the speed change mechanism is limited as mentioned above.

Therefore, under conditions when the speed ratio target value suddenly changes discontinuously, such as when the accelerator pedal is largely depressed and a downshift is performed, or when the accelerator pedal is released and an upshift is performed, the desired speed ratio response cannot be attained.

In order to improve this situation, the dynamic characteristic compensator might be made a feedback compensator. However, if the dynamic characteristic compensator is made a feedback compensator, the speed ratio response and the response to disturbances cannot be designed independently.

That is, although the dynamic characteristic compensator is designed so that the desired speed ratio response is obtained, the speed ratio response is determined by feeding back the real speed ratio including the result compensated by the disturbance compensator, so the dynamic characteristic compensator and disturbance compensator cannot be designed independently.

It is therefore an object of this invention to decrease the deviation between the transient target ratio and real speed ratio and achieve a desired speed ratio response even in the case where operation of a speed change mechanism is limited. It is a further object of this invention to independently design the speed ratio response and response to disturbances.

SUMMARY OF THE INVENTION

To achieve the above object, this invention provides a speed ratio control system comprising: a first compensator which computes a speed ratio command value based on a final target ratio determined according to a running state, a time constant representing a predetermined dynamic characteristic and a time constant representing an estimated dynamic characteristic of a transmission, a calculating element which calculates a transient target ratio based on the final target ratio and the time constant representing the predetermined dynamic characteristic, a calculating element which calculates a correction amount of the speed ratio command value based on the difference between the transient target ratio and a real speed ratio, and an adder/subtractor which corrects the speed ratio command value based on the correction amount. The control system controls the transmission based on the speed ratio command value after correction.

According to this invention, the speed ratio control system controls the continuously variable transmission so that the real speed ratio approaches the final target ratio determined according to a running condition under the predetermined dynamic characteristic, and the real speed ratio follows the transient target ratio computed based on the predetermined dynamic characteristic and final target ratio. When the real speed ratio does not approach the final target ratio under the predetermined dynamic characteristic due to a drive speed limit or an angular position limit, etc. of a step motor, and a difference arises between the transient target ratio and real speed ratio, a correction according to the difference is applied to the speed ratio command value. In this way, the difference between the transient target ratio and real speed ratio can be reduced, so even if step motor has a drive speed limit and angular position limit, the impairment of speed ratio response performance which would otherwise occur can be suppressed.

Moreover, according to this invention, a speed ratio control system is provided having a second compensator which further compensates the speed ratio command value by a filter using approximate zeroing so that disturbances acting on the transmission are compensated. By correcting the speed ratio command value so that disturbances, such as parameter fluctuations and step out of the step motor, are compensated, the dynamic characteristic compensator which computes the speed ratio command value is not subject to these influences and the speed ratio response and responsiveness to disturbances can be designed independently.

Further, according to this invention, the speed ratio command value correction amount calculating element computes a correction amount of the speed ratio command value by passing the difference between the transient target ratio and real speed ratio via a filter whereof the stability relative to variation of a time constant representing a dynamic characteristic of the transmission, is compensated. Hence, the speed ratio response and responsiveness to disturbances can be designed independently, and even if the time constant which represents the dynamic characteristic of the CVT is incorrectly estimated, the effect of this on speed ratio control performance response can be suppressed low.

The details as well as other features and advantages of this invention are set forth in the remainder of the specification and are shown in the accompanying drawings.

DETAILED DESCRIPTION OF THE INVENTION

Figure 1:
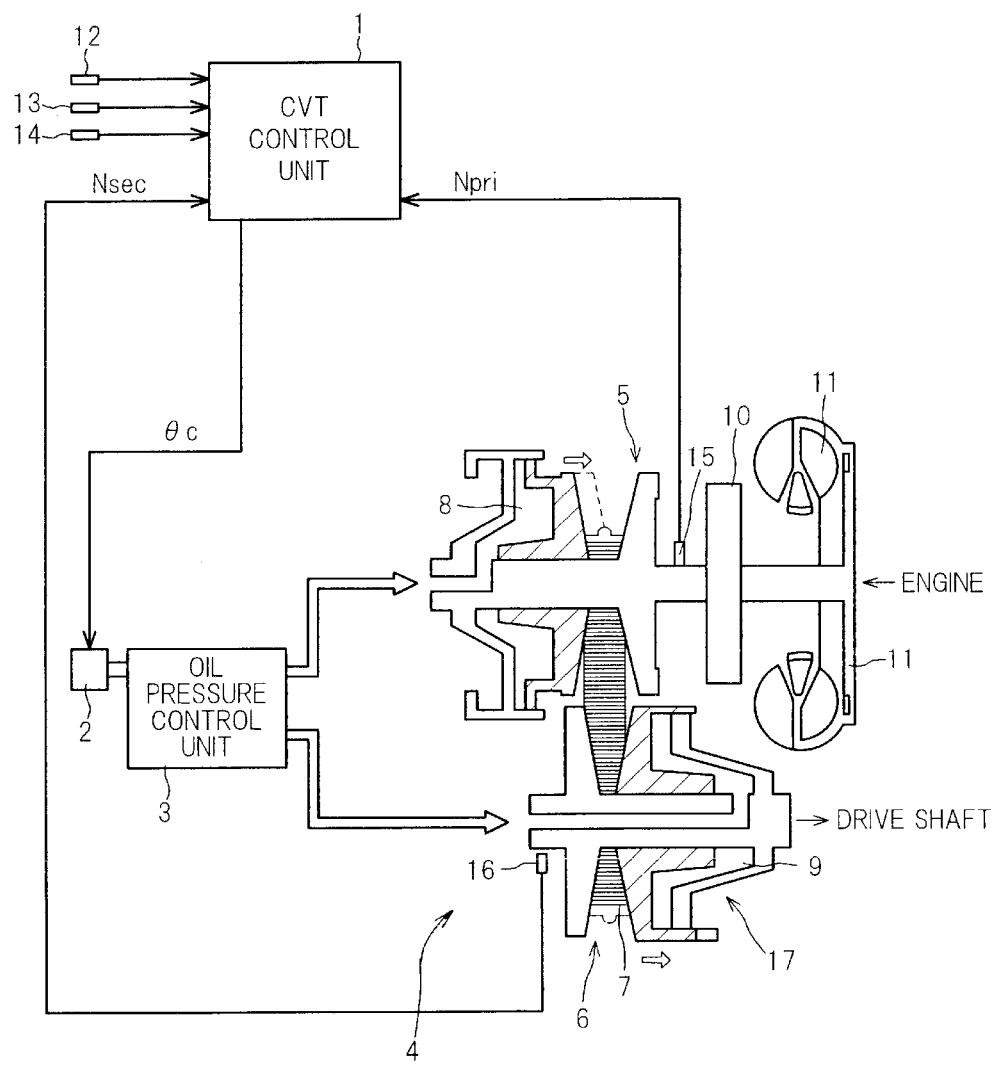
FIG. 1 is a schematic block diagram of a speed ratio control system of a continuously variable transmission (CVT) according to) this invention.

Referring to FIG. 1 of the drawings, a speed ratio control system according to this invention comprises a continuously variable transmission (CVT) 4 and CVT control unit 1.

The CVT 4 comprises a speed change mechanism 17 connected to an engine, not shown, via a forward/reverse change-over mechanism 10 and torque converter 11, an oil pressure control unit 3 which controls the oil pressure supply to the speed change mechanism 17, and a step motor 2 which drives a speed ratio control valve, not shown, in the oil pressure control unit 3.

The speed change mechanism 17 is provided with a pair of belt pulleys 5, 6 of which the groove width can be varied, and a V-belt 7 looped around them. The speed change mechanism 17 varies the speed ratio continuously by varying the groove width of the belt pulleys 5 and 6.

By driving the speed ratio control valve, not shown, in the oil pressure control unit 3 according to the angular position of the step motor 2, the oil pressure applied to oil pressure cylinders 8, 9 formed on the rear surface of a movable conical plate of the belt pulleys 5, 6 is adjusted. As a result, the groove widths of the belt pulleys 5, 6 are mutually varied inversely, and the speed ratio of the speed change mechanism 17 is varied.

The CVT control unit 1 comprises a central processing unit, random access memory, read only memory and I/O interface, etc.

A throttle opening signal TVO from a throttle opening sensor 12, a shift lever position signal from an inhibitor switch 13 and an oil temperature signal from an oil temperature sensor 14, as well as an input rotation speed signal $N_{pri}$ from an input rotation speed sensor 15 of the speed change mechanism 17 and an output rotation speed signal $N_{sec}$ from an output rotation speed sensor 16 are input into the CVT control unit 1.

The CVT control unit 1 computes a final target ratio $i_{PT}$ which is a final target speed ratio based on these various input signals, and computes a speed ratio command value $i_{PCF}$ so that the real speed ratio $i_{PR}$ of the speed change mechanism 17 approaches the final target ratio $i_{PT}$ with a predetermined dynamic characteristic. The speed ratio command value $i_{PCF}$ is converted into an angular position command value $\theta_C$ by the CVT control unit 1, and is output to the step motor 2.

Figure 2:
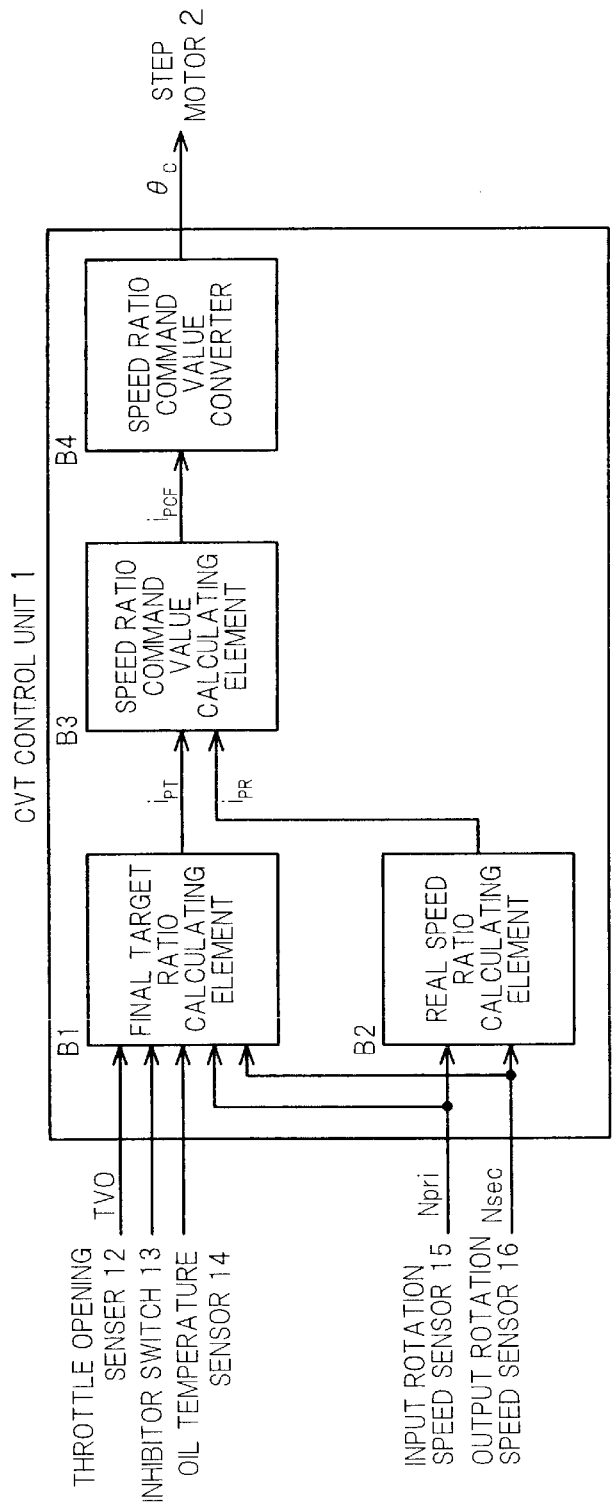
FIG. 2 is a block diagram showing the configuration of a CVT control unit.

FIG. 2 shows the configuration of the CVT control unit 1.

As shown in this figure, the CVT control unit 1 comprises a final target ratio calculating element B1, real speed ratio calculating element B2, speed ratio command value calculating element B3, and speed ratio command value converter B4.

The calculating element B1 computes the final target ratio $i_{PT}$ based on the throttle opening signal TVO mentioned above, input rotation speed signal $N_{pri}$, and output rotation speed signal $N_{sec}$, etc. The calculating element B1 outputs the final target ratio $i_{PT}$ to the speed ratio command value calculating element B3. The final target ratio $i_{PT}$ is determined according to the running state. The final target ratio $i_{PT}$ is determined by looking up a map which specifies the relation between the throttle opening TVO, output rotation speed $N_{sec}$ and final target ratio $i_{PT}$ based for example on the throttle opening TVO.

The calculating element B2 calculates the real speed ratio $i_{PR}$ of the speed change mechanism 17 by the following equation (1) from the input rotation speed $N_{pri}$ and output rotation speed $N_{sec}$ of the speed change mechanism 17.

$$i_{PR}=N_{pri}/N_{sec} \quad (1)$$

The calculating element B2 outputs the real speed ratio $i_{PR}$ to the calculating element B3.

The calculating element B3 computes the speed ratio command value $i_{PCF}$ for achieving the speed ratio response desired by the designer based on the final target ratio $i_{PT}$ and the real speed ratio $i_{PR}$. The calculating element B3 then outputs the speed ratio command value $i_{PCF}$ to the converter B4.

The converter B4 converts the speed ratio command value $i_{PCF}$ to an angular position command value $\theta_C$ by looking up a map which specifies the relation between the angular position of the step motor 2, and the speed ratio of the speed change mechanism 17. The converter B4 then outputs the command value $\theta_C$ to the step motor 2.

Next, the speed ratio control performed by the CVT control unit 1 will be described in detail, referring to FIG. 3 to FIG. 9.

Figure 3:
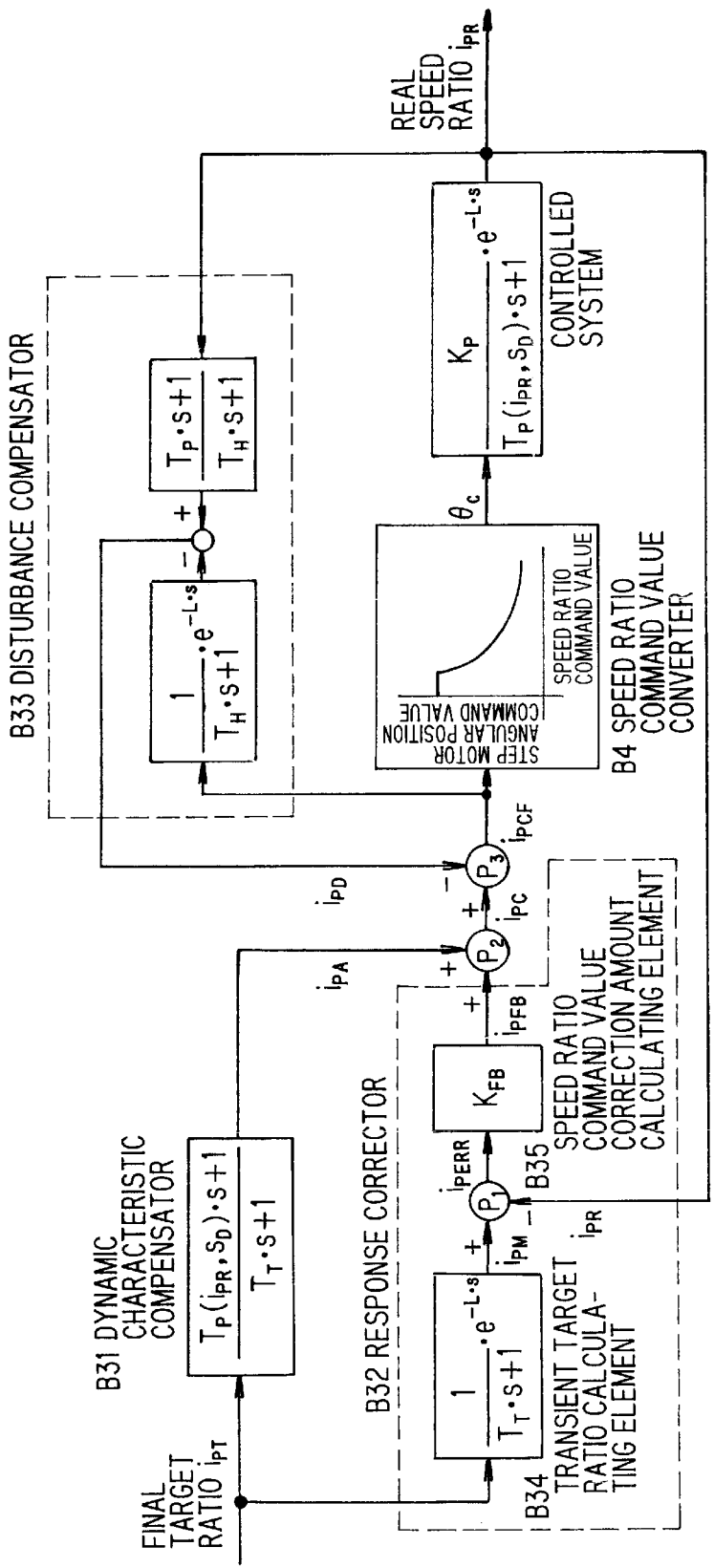
FIG. 3 is a block diagram of a speed ratio control system.

FIG. 3 is a block diagram of a speed ratio control system.

The speed ratio control system comprises a dynamic characteristic compensator (first compensator) B31, response corrector B32, disturbance compensator (second compensator) B33, speed ratio command value converter B4, the CVT 4 which is controlled, and adder/subtractors $P_1$, $P_2$, $P_3$.

The dynamic characteristic of the CVT 4 can be expressed by a first order lag and a dead time as shown by the next equation (2).

$$G_P = \frac{K_P}{T_P(i_{PR}, s_D) \cdot s + 1} \cdot e^{-Ls} \qquad (2)$$

L=dead time.
s=differential operator,
$K_P$=gain of CVT 4,
$T_P$=time constant representing dynamic characteristic of the CVT 4,
$i_{PR}$=real speed ratio,
$S_D$=speed change direction.

Figure 4:
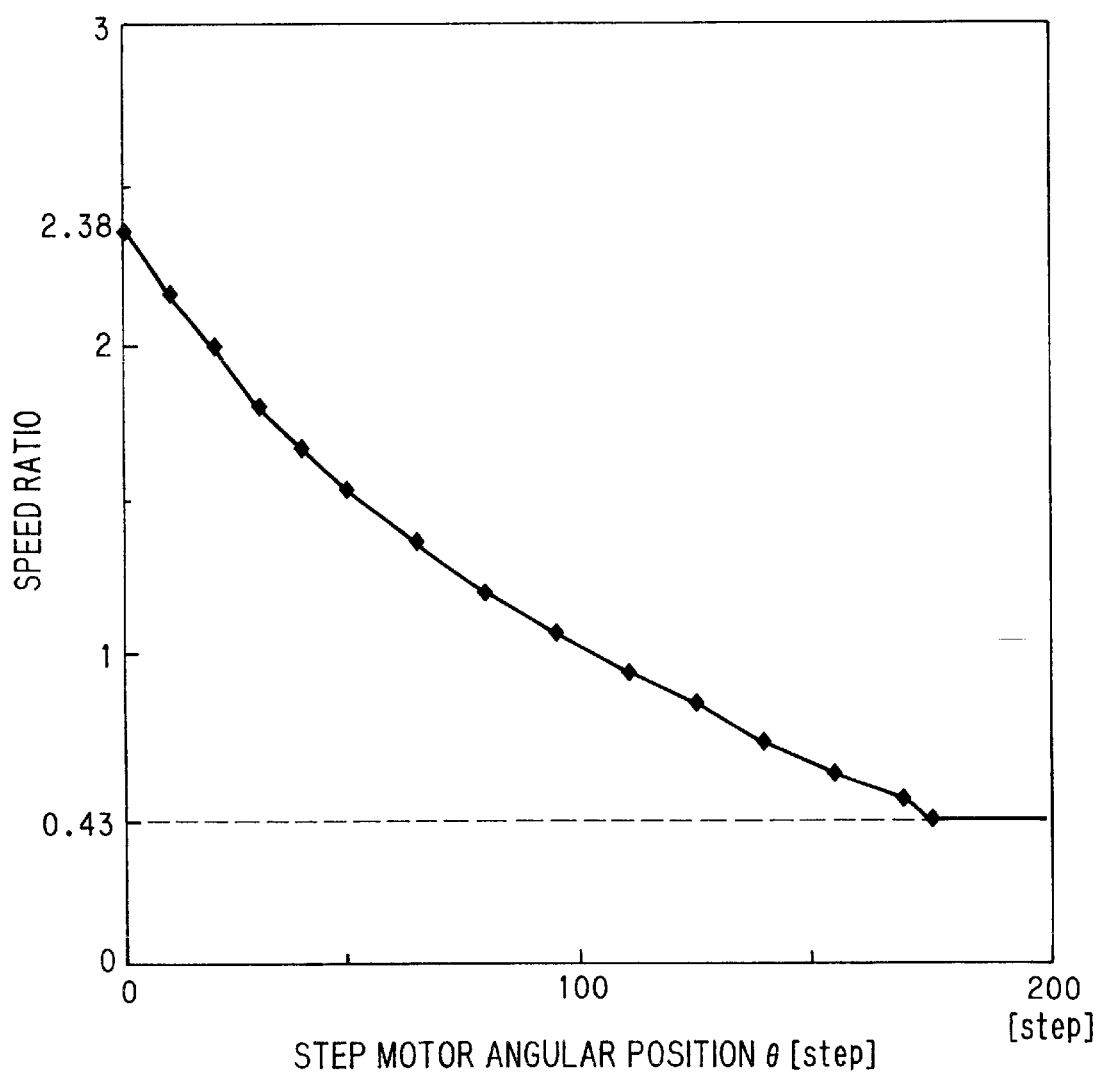
FIG. 4 is a map which specifies the relation between the angular position of a step motor, and the speed ratio of the CVT.
Figure 5:
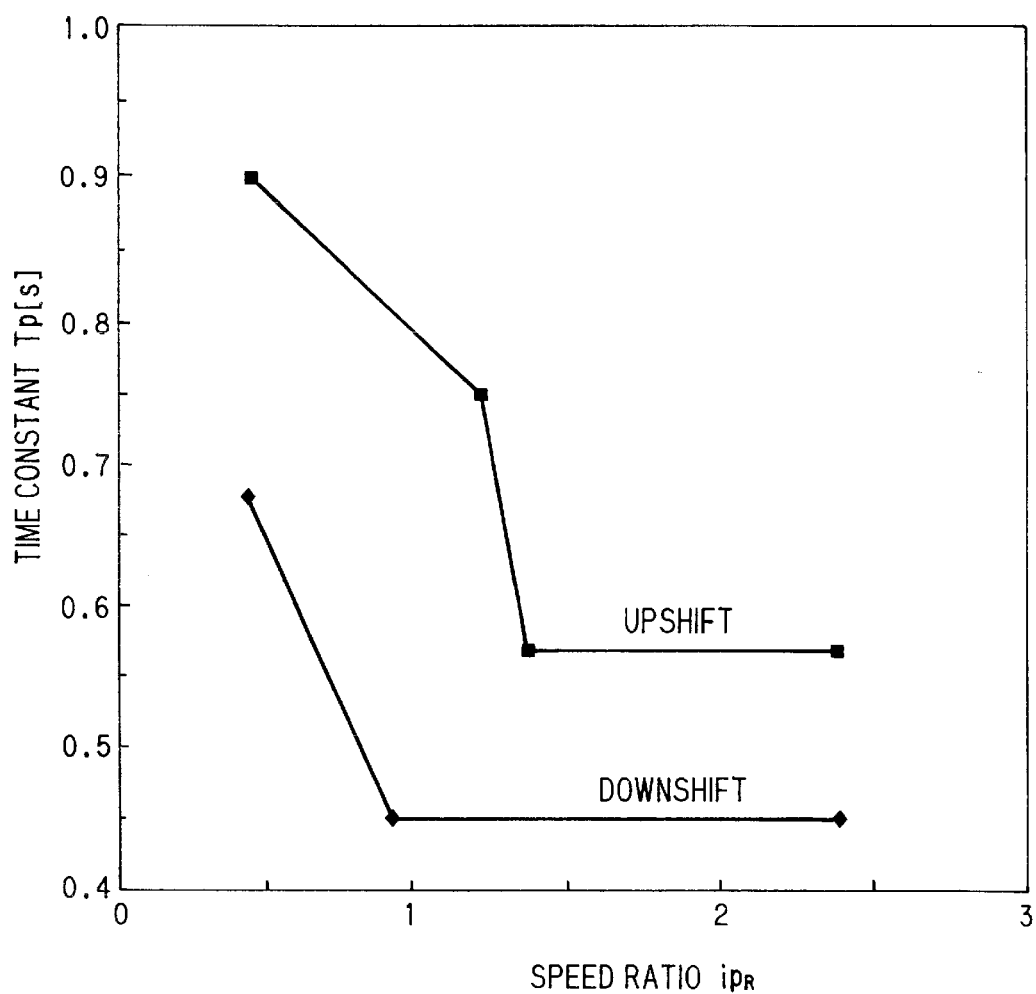
FIG. 5 is a map which specifies the relation between a real speed ratio, speed change direction and a time constant representing the dynamic characteristic of the CVT.

As the angular position of the step motor 2 and the speed ratio of the speed change mechanism 17 are not directly proportional as shown in FIG. 4, the gain $K_P$ of the CVT 4 is computed according to the real speed ratio $i_{PR}$ of the speed change mechanism 17.

Also, the time constant $T_P$ showing the dynamic characteristic of the CVT 4 varies according to the real speed ratio $i_{PR}$ and the speed change direction $S_D$ (upshift direction or downshift direction). Therefore, the time constant $T_P$ is computed by referring to a map shown in FIG. 5 based on identification experiments from the real speed ratio $i_{PR}$ and the speed change direction $S_D$.

As the time constant $T_P$ is affected by the pressure of the oil pressure source which varies the groove widths of the belt pulleys 5, 6, the pressure of the oil pressure source may also be taken into consideration in computing the time constant $T_P$.

Moreover, the speed change direction SD is determined using the real speed ratio $i_{PR}$ and variables of the speed ratio servo system. A specific identification method, wherein the opening direction of the speed ratio control valve is computed based on the displacement amount of the speed ratio control valve, is disclosed in Tokkai Hei 8-338515 published by the Japanese Patent Office in 1996.

Each element of the speed change control system will now be described referring to the above.

First, the dynamic characteristic compensator B31 will be described. The compensator B31 is a feed forward compensator.

If the speed ratio response desired by the designer is given by the next equation (3), $$G_T = \frac{1}{T_T \cdot s + 1} \cdot e^{-Ls} \qquad (3)$$

the compensator B31 computes the speed ratio command value $i_{PA}$ based on the next equation (4) so that the real speed ratio $i_{PR}$ approaches the final target ratio $i_{PT}$ with a dynamic characteristic $G_T$. That is, the compensator B31 comprises a first order/first order filter.

$$i_{PA} = \frac{T_P(i_{PR}, s_D) \cdot s + 1}{T_T \cdot s + 1} \cdot i_{PT} \qquad (4)$$

$T_P$=time constant for obtaining the speed ratio response desired by the designer.
$T_T$=time constant $T_T$ is determined by a preset map based on the difference between the final target ratio $i_{PT}$ and a transient target ratio $i_{PM}$ mentioned later.

Therefore, the compensator B31 outputs the speed ratio command value $i_{PA}$ so that the speed ratio response desired by the designer is achieved with the final target ratio $i_{PT}$ as input.

Next, the response compensator B32 will be described.

The compensator B32 comprises a transient target ratio calculating element B34 and a correction amount calculating element B35.

The calculating element B34 computes the transient target ratio $i_{PM}$ which is the speed ratio response desired by the designer with the final target ratio $i_{PT}$ as input, based on the next equation (5). This transient target ratio $i_{PM}$ is a transitional target value until the real speed ratio $i_{PR}$ reaches the final target ratio $i_{PT}$.

$$i_{PM} = \frac{1}{T_T \cdot s + 1} \cdot i_{PT} \qquad (5)$$

The lag due to the dead time of the CVT 4 may also be taken into consideration, as shown in the following equation (6).

$$i_{PM} = \frac{1}{T_T \cdot s + 1} \cdot e^{-Ls} \cdot i_{PT} \qquad (6)$$

In the calculating element B35, in the case of proportional control, for example, a difference $i_{PERR}$ ($=i_{PM}-i_{PR}$) of the transient target ratio $I_{PM}$ and the real speed ratio $i_{PR}$ which is the output of the adder/subtractor P$_1$, is input, and a correction amount $i_{PFB}$ of the speed ratio command value $i_{PA}$ is computed by the next equation (7).

$$i_{PFB} = K_{FB} \times i_{PERR} \qquad (7)$$

$K_{FB}$=proportional gain determined by the time constant $T_P$ representing the dynamic characteristic of the CVT 4.

Next, the disturbance compensator B33 will be described. A The compensator B33 takes the dynamic characteristic of the CVT 4 given by the equation (1) as a reference model, and is designed so that the reference model is not disturbed by mass production dispersion (parameter fluctuation) and disturbance due for example to step out of the step motor. Specifically, the compensator B33 comprises a filter which uses approximate zeroing, and computes a disturbance compensation output $i_{PD}$ based on the following equation (8) from the real speed ratio $i_{PR}$ and speed ratio command value $i_{PCF}$ described later.

$$i_{PD} = \frac{T_P \cdot s + 1}{T_H \cdot s + 1} \cdot i_{PR} - \frac{1}{T_H \cdot s + 1} \cdot e^{-Ls} \cdot i_{PCF} \qquad (8)$$

$T_H$ is the cutoff frequency of the low pass filter of the compensator B33, and is determined according to the time constant $T_P$ representing the dynamic characteristic of the CVT 4.

Figure 6:
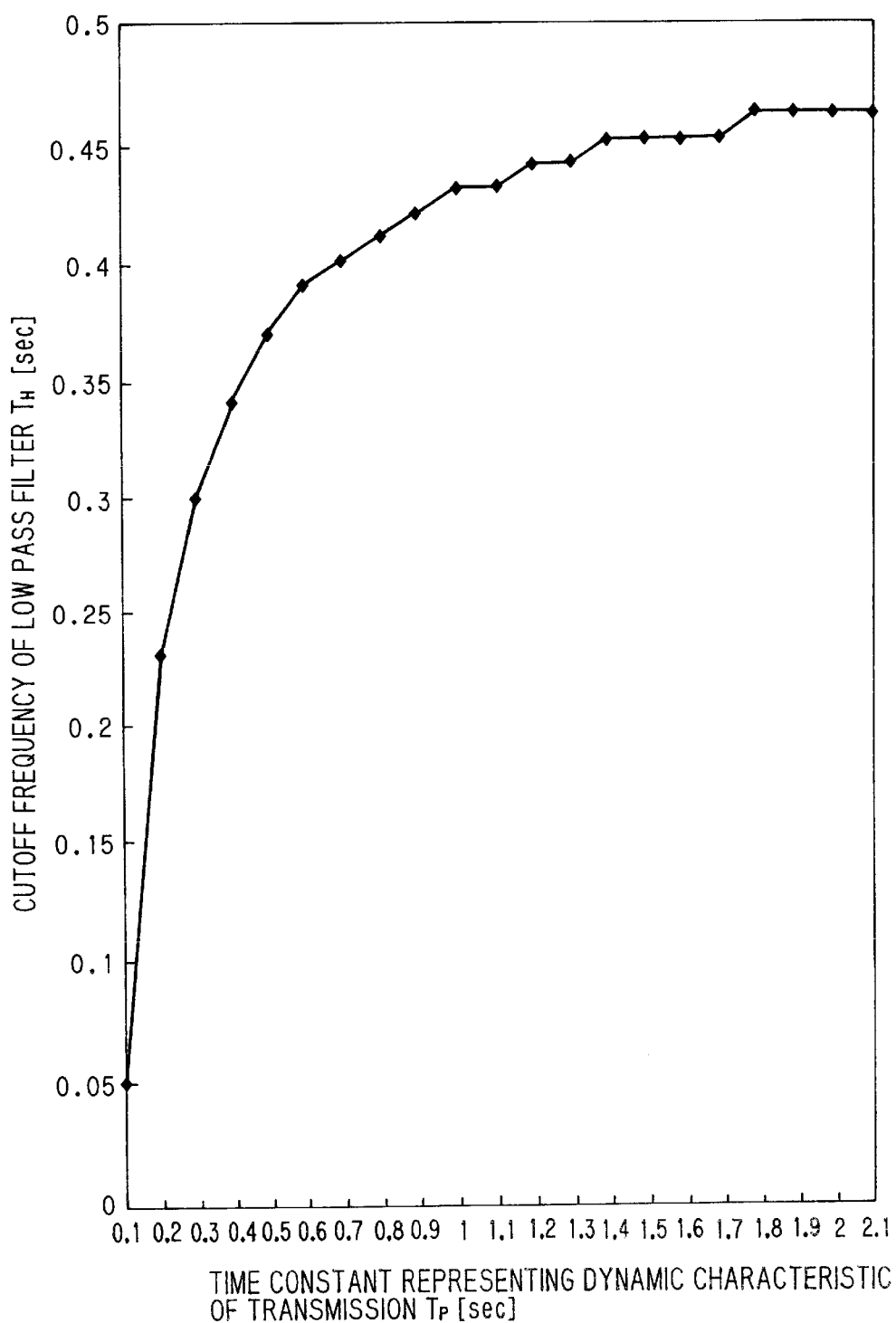
FIG. 6 is a map which specifies the relation between the time constant showing the dynamic characteristic of the CVT, and a low pass filter cutoff frequency of a disturbance compensator.

The feedback gain $K_{FB}$ and the cutoff frequency $T_H$ of the low pass filter of the compensator B33 are designed so that the stability of the control system desired by the designer is achieved. For example, when the feedback gain $K_{FB}$ is fixed to 0.3, and a stability of at least 12 dB gain margin and at least 45 degrees phase margin is assured, the relation of the time constant $T_P$ representing the dynamic characteristic of the CVT 4 and the cutoff frequency $T_H$ is as shown in FIG. 6.

In the adder/subtractor P$_2$, the speed ratio command value $i_{PA}$ is corrected by the correction amount $i_{PFB}$ to compute the speed ratio command value $i_{PC}$.

$$i_{PC} = i_{PA} + i_{PFB} \qquad (9)$$

Subsequently, in the adder/subtractor P$_3$, the speed ratio command value $i_{PCF}$ is further corrected by the disturbance compensation output $i_{PD}$ to calculate a final speed ratio command value $i_{PCF}$.

$$i_{PCF} = i_{PC} - i_{PD} \tag{10}$$

By supplying the step motor 2 with the speed ratio command value $i_{PCF}$ computed from the above equation (10), a speed ratio response which is not easily affected by disturbances such as parameter fluctuations, and which is desired by the designer, is obtained.

However, as the speed ratio of the speed change mechanism 17 is not proportional to the angular position of the step motor 2, in the speed ratio command value converter B4, the speed ratio command value $i_{PCF}$ is converted into the step motor angular position command value $\theta_C$ by looking up the map shown in FIG. 4, and this is output to the step motor 2.

Figure 7:
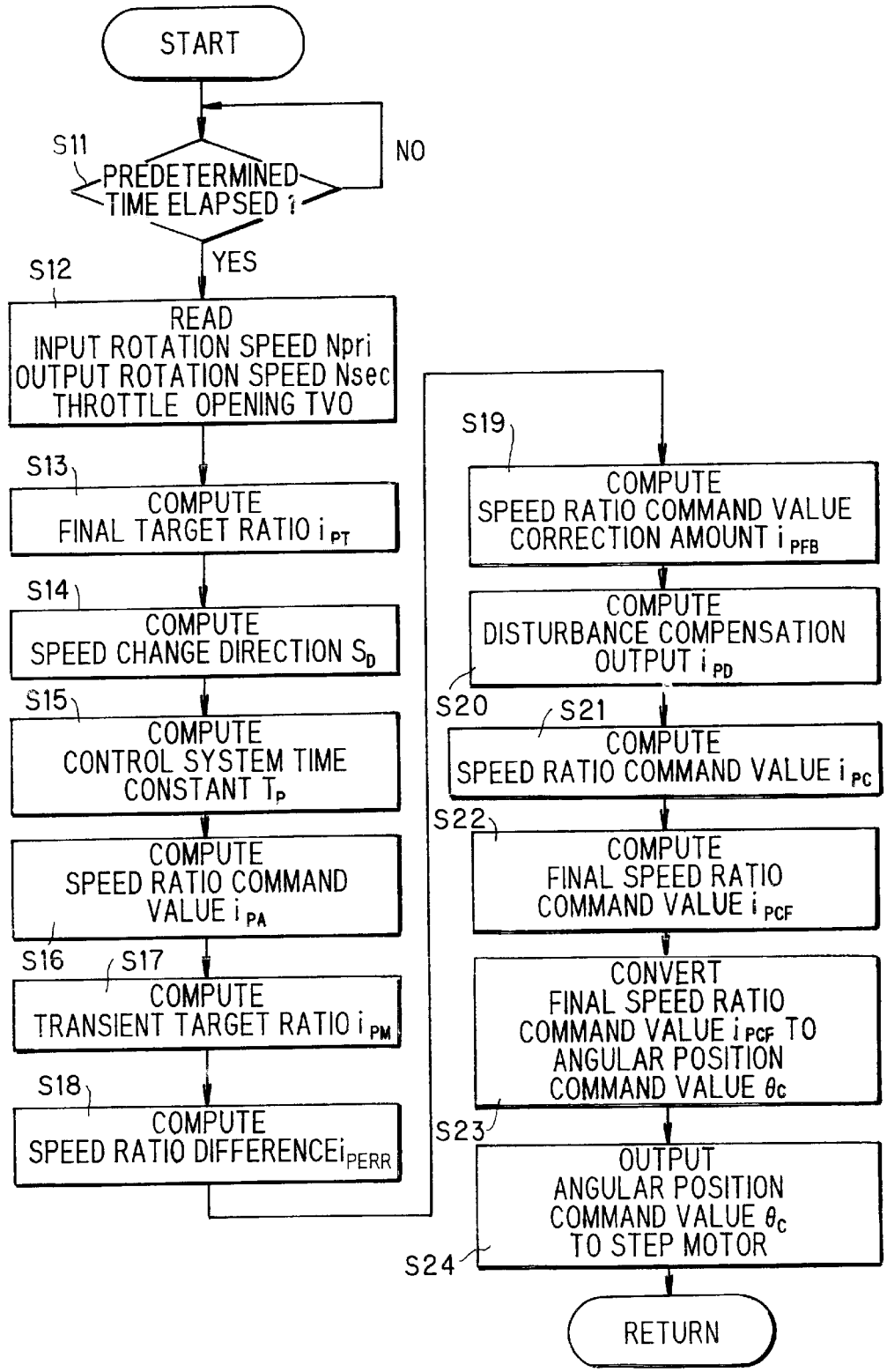
FIG. 7 is a flowchart for describing the processing content of the CVT control unit.

Next, the operation of this speed ratio control system will be described referring to the flowchart shown in FIG. 7.

First, after a predetermined time has elapsed in a step S11, the input rotation speed $N_{pri}$ of the speed change mechanism 17, output rotation speed $N_{sec}$, throttle opening TVO and shift lever position are read in a step S12.

Next, in a step S13, the final target ratio $i_{PT}$ which is a final target speed ratio is computed based on the signals read. In a step S14, the speed change direction $S_D$ of the speed ratio control valve of the oil pressure control unit 3 is computed. In a step S15, the time constant $T_P$ which represents the dynamic characteristic of the CVT 4 is computed by looking up the map shown in FIG. 5 based on the real speed ratio $i_{PR}$ and the speed change direction $S_D$.

In a step S16, the speed ratio command value $i_{PA}$ is computed based on the final target ratio $i_{PT}$, the time constant $T_P$ representing the dynamic characteristic of the CVT 4, and the time constant $T_T$ representing the speed ratio response desired by the designer. In a step S17, the transient target ratio $i_{PM}$ which is the speed ratio response desired by the designer, is computed based on the final target ratio $i_{PT}$, time constant $T_T$ and dead time L.

In a step S18, the difference $i_{PERR}$ of the transient target ratio $i_{PM}$ and real speed ratio $i_{PR}$ is computed. In a step S19, this difference $i_{PERR}$ is multiplied by the feedback gain $K_{FB}$ to compute the correction amount $i_{PFB}$.

In a step S20, the disturbance compensation output $i_{PD}$ is computed based on the real speed ratio $i_{PR}$ and speed ratio command value $i_{PCF}$. In a step S21, the speed ratio command value $i_{PA}$ is corrected by the correction amount $i_{PFB}$ to compute the speed ratio command value $i_{PC}$.

In a step S22, the speed ratio command value $i_{PC}$ is further corrected by the disturbance compensation output $i_{PD}$ to compute the final speed ratio command value $i_{PCF}$. In a step S23, the speed ratio command value $i_{PCF}$ is converted to the angular position command value $\theta_C$ by looking up a predetermined map. In a step S24, this command value $\theta_C$ is output to the step motor 2.

Therefore, according to this flowchart, the angular position of the step motor 2 is normally controlled so that the real speed ratio $i_{PR}$ of the speed change mechanism 17 approaches the final target ratio $i_{PT}$ with a predetermined dynamic characteristic. If a difference arises between the transient target ratio $i_{PM}$ and the real speed ratio $i_{PR}$ due to the drive speed limit of the step motor 2, the correction amount $i_{PFB}$ is added to the speed ratio command value $i_{PA}$.

Next, the speed ratio responsiveness of a prior art speed ratio control system and the speed ratio control system of this invention are compared.

Figure 8:
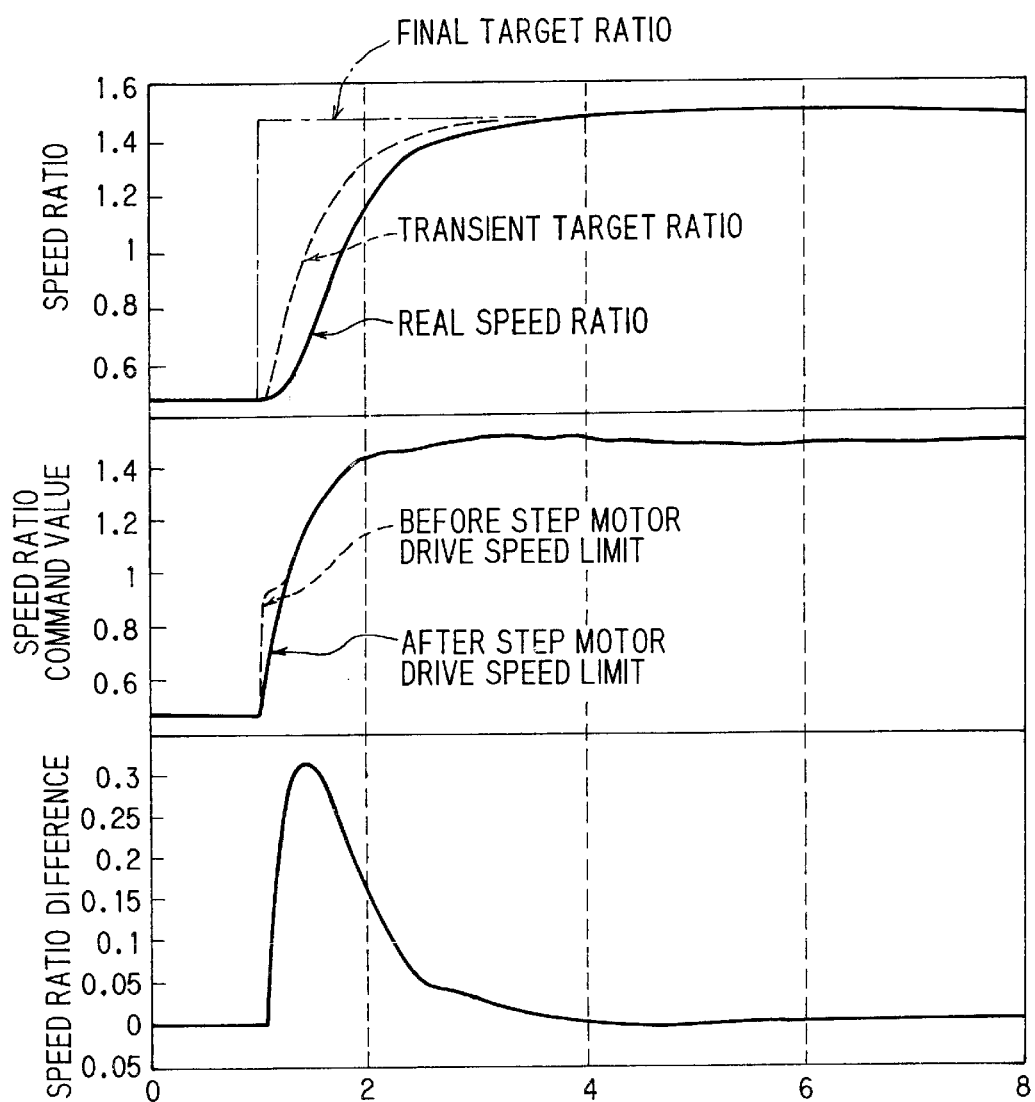
FIG. 8 shows simulation results when a final target ratio is varied in a prior art speed ratio control system.
Figure 9:
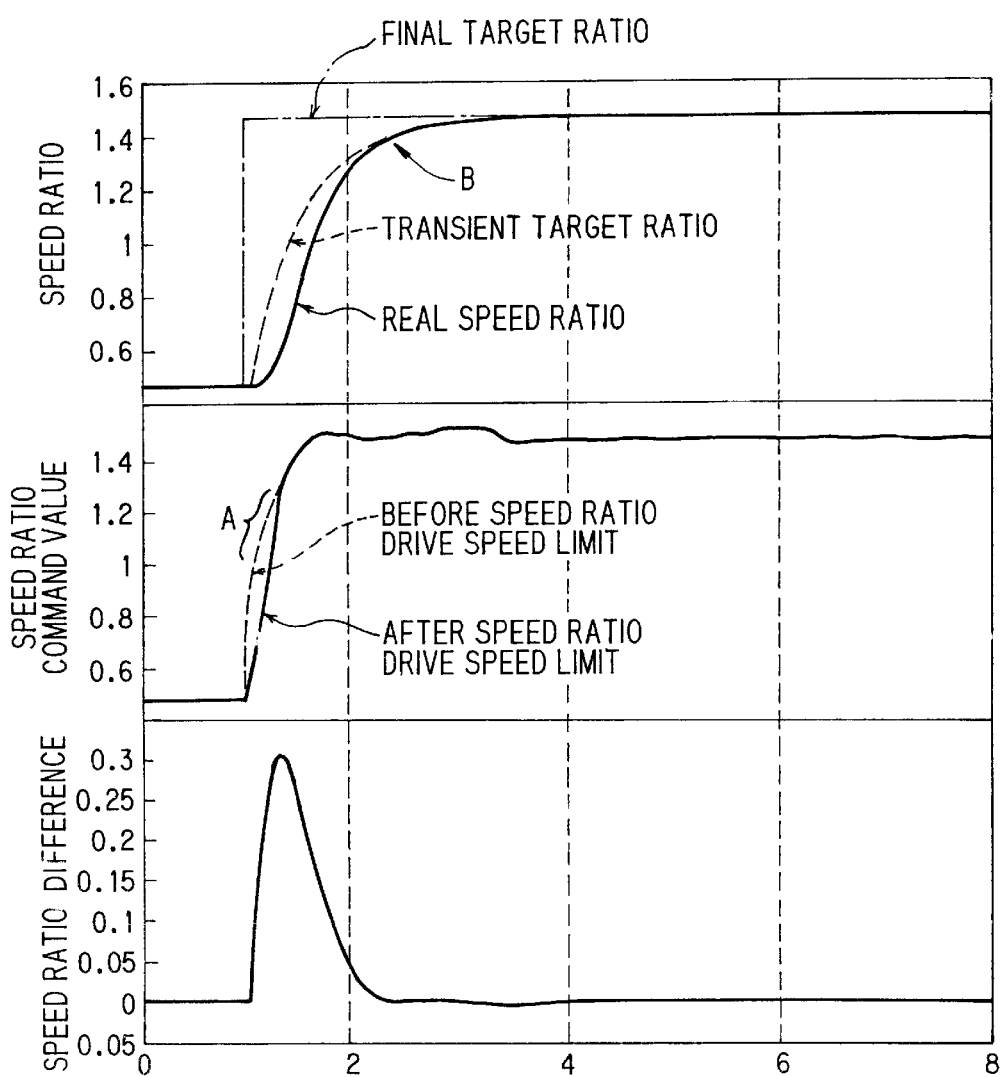
FIG. 9 shows simulation results when a final target ratio is varied in a speed ratio control system according to this invention.

FIG. 8 and FIG. 9 show simulation results when the final target ratio is varied from 0.47 to 1.47 in a step-like manner in a prior art speed ratio control system and the speed ratio control system of this invention.

This simulation corresponds to the running condition where the speed ratio increases rapidly, such as when the foot is separated from the accelerator pedal and an upshift is performed. The figures show speed ratios (final target ratio, transient target ratio and real speed ratio), speed ratio command value (speed ratio command value before and after the step motor drive speed limit), and speed ratio difference (difference between the speed ratio command value and real speed ratio) from the top down.

The dynamic characteristic compensator of a prior art speed ratio control system is designed so that the time constant $T_T$ is 0.5[sec], and the dynamic characteristic compensator of the speed ratio control system of this invention is designed so that the time constant $T_T$ is 0.5[sec] and the feedback gain $K_{FB}$ is fixed at 0.3.

Hence, in a prior art system, as the dynamic characteristic compensator comprises only a feed forward compensator, the effect of the limit on the speed ratio command value due to the drive speed limit of the step motor (1.0[sec]–1.5[sec]) continues even after the limit is removed (1.5[sec]–[sec]), as shown in FIG. 8.

This is because the disturbance compensator is only intended to compensate for disturbances such as parameter fluctuations of the CVT due to oil deterioration or assembly inconsistencies, and cannot provide compensation when operation of the speed change mechanism is limited.

On the other hand in this invention, as shown in FIG. 9, although an identical response to that of the prior art is obtained when the speed starts to change (1[sec]–1.5[sec]), as the speed ratio command value is corrected subsequently by the response corrector so that the real speed ratio approaches the transient target ratio (A in FIG. 9), the difference becomes smaller than in the prior art method (B in FIG. 9).

Hence, in this invention, as the effect of limiting the speed ratio command value due to the drive speed limit of the step motor does not continue after the drive speed limit is released, impairment of speed ratio response is suppressed even under a running condition wherein the speed ratio target value changes discontinuously. The simulation results shown here apply to the case when the final target ratio increases in a step-like fashion, but an identical effect is obtained even when it decreases in a step-like fashion.

In the above-mentioned embodiment, the dynamic characteristic of the CVT 4 which is controlled is measured beforehand with the real speed ratio $i_{PR}$ and speed change control valve opening direction SD as arguments, and the time constant $T_P$ representing the dynamic characteristic of the CVT 4 is estimated using a map based on this measured result.

However, as the speed change control valve opening direction $S_D$ which is an argument of the map, is determined using the real speed ratio $i_{PR}$ or parameters of the speed ratio servo system, there is a possibility that the opening direction $S_D$ may be incorrectly identified if the time constant variation is small. If the opening direction $S_D$ is incorrectly identified, the time constant $T_P$ will also be incorrectly estimated, and this will have a slight effect on speed ratio servo performance.

This is because, as the disturbance compensator B33 comprises a filter using approximate zeroing, when the time constant varies discontinuously such as when there is a change-over from upshift to downshift, and the time constant representing the dynamic characteristic of the CVT 4 is different from the estimated time constant, a the disturbance compensator B33 performs an excessive compensation although disturbances have not occurred. An identical effect to the above occurs also when the dynamic characteristic map measured beforehand is different from the real dynamic characteristic due to production inconsistencies such as fixing errors of the CVT speed change mechanism 17.

The second embodiment described below resolves the above-mentioned problem, and further increases the speed ratio response performance.

Figure 10:
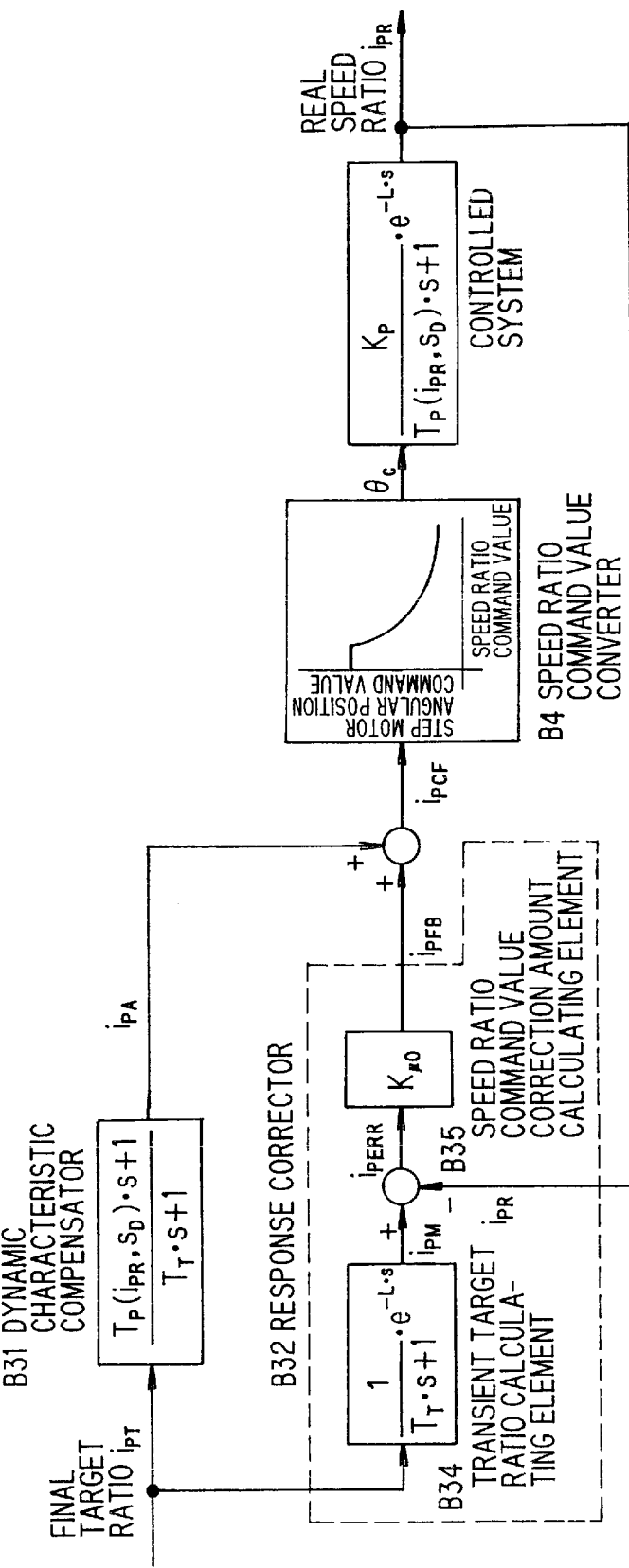
FIG. 10 is similar to FIG. 3, but is a block diagram showing a second embodiment.

FIG. 10 is a block diagram of a speed ratio control system relating to the second embodiment.

The speed ratio control system comprises the dynamic characteristic compensator B31, response corrector B32, speed ratio command value converter B4 and the CVT 4. Unlike the first embodiment, a disturbance compensator which comprises a filter using approximate zeroing is not provided.

The response corrector B32 comprises the transient target ratio calculating element B34 and correction amount calculating element B35, but the configuration of the calculating element B35 is different from that of the first embodiment.

Namely, in the first embodiment, the computing unit B35 multiplies the difference $i_{PERR}$ of the transient target ratio $i_{PM}$ and the real speed ratio $i_{PR}$ by the proportional gain $K_{FB}$ to compute the correction amount $i_{PFB}$ of the speed ratio command value $i_{PA}$. On the other hand, in the second embodiment, the calculating element B35 has integrating characteristics, and computes the correction amount $i_{PFB}$ using a filter $K_{\mu 0}$ having a stability compensated for the variation of the time constant $T_P$ which represents the dynamic characteristic of the CVT 4, and the dead time $e^{-Ls}$.

Hereafter, the design method for the calculating element B35 will be described.

Figure 11:
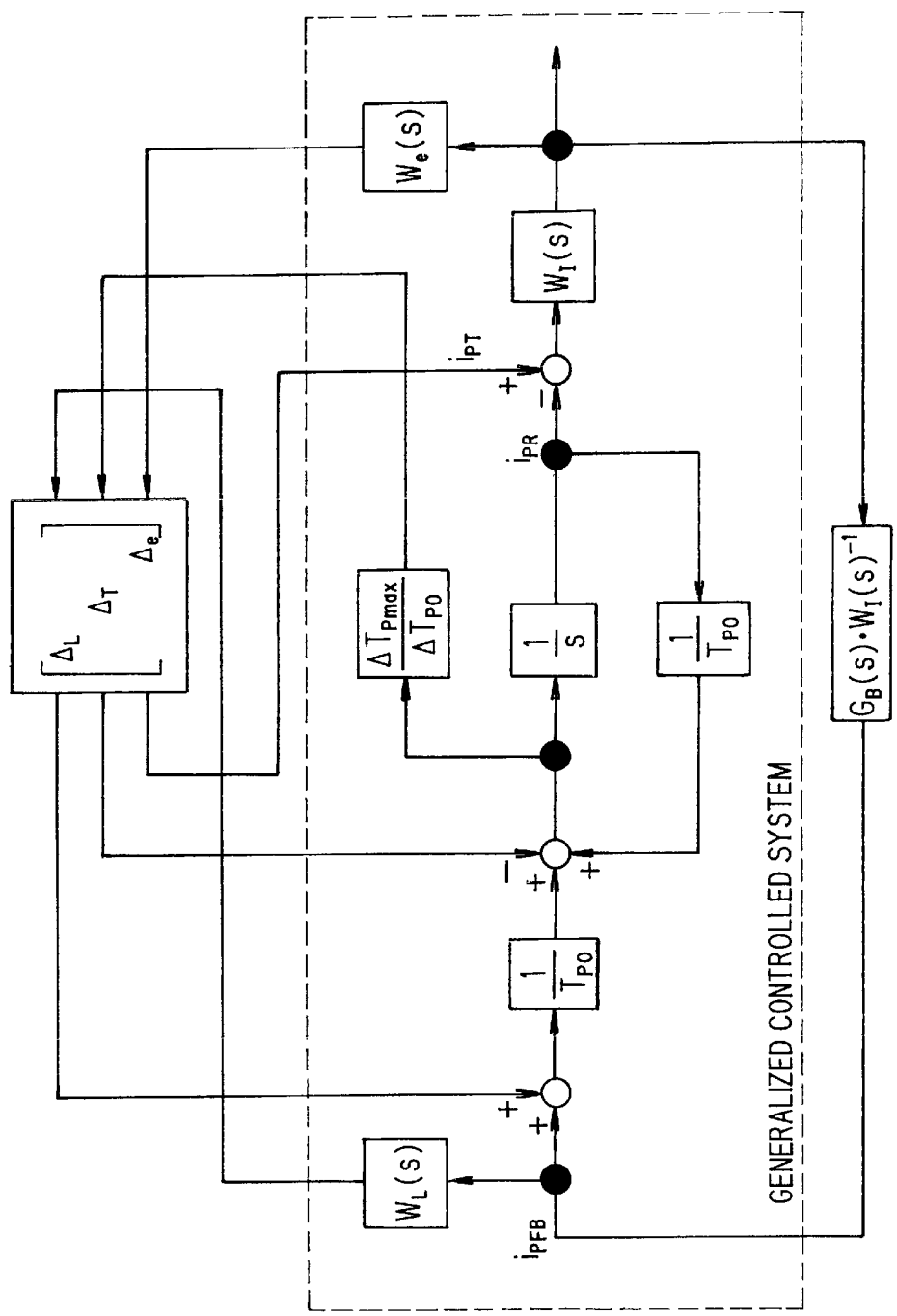
FIG. 11 is a block diagram for designing a correction amount calculating element.

FIG. 11 is a block diagram for designing the calculating element B35. The part enclosed by the dotted line in the figure is a generalized controlled system (generalized plant) which represents the uncertainty due to the variation of the time constant $T_P$ representing the dynamic characteristic of the CVT 4, and the uncertainty due to the dead time of the dynamic characteristic of the CVT 4 as disturbances.

Describing this in more detail, first, by using the internal model principle, a compensator $W_1(s)$ is set to ensure that the plant of the controlled system is provided with integration characteristics and a filter $K_{\mu 0}(s)$ has integration characteristics.

$$W_1(s) = \frac{s+1}{s} \quad (11)$$

By formulating a generalized controlled system to design the filter $K_{\mu 0}$, steady-state deviation can be eliminated and the closed-loop system can be made absolutely stable to every frequency.

Regarding the variation of the time constant $T_P$ representing the dynamic characteristic of the CVT 4, $T_{P0}$ is taken as the median value of the time constant variation, and the maximum variation of the time constant variation from the median $T_{P0}$ is taken as $\Delta T_{Pmax}$.

Regarding the dead time $e^{-Ls}$ of the CVT 4, this uncertainty can be represented by a multiplicative variation $e^{-Ls}-1$, and can therefore be represented by the following transfer function.

$$W_L(s) = \frac{2.1 \cdot L \cdot s}{L \cdot s + 1} \quad (12)$$

The following equation (13) then holds for an arbitrary frequency ω.

$$|e^{-L \cdot jw} - 1| < |W_L(jw)| \quad (13)$$

When the uncertainty of the dead time $e^{-Ls}$ varies largely due to manufacturing inconsistencies or deterioration with age, a fluctuation $n_e$ may be taken into consideration as shown in the following equation (14).

$$W_L(s) = \frac{2.1 \cdot n_e \cdot L \cdot s}{n_e \cdot L \cdot s + 1} \quad (14)$$

The controller $K(s)$ $(=K_{\mu 0} \cdot W_1(s)^{-1})$ is designed using the characteristic of the CVT 4 defined by equations as described above. Here, $\mu$ analysis is used for stability analysis/control system design, and the stability for the arbitrary frequency ω is compensated by adjusting the design parameter $W_C$. The controller $K(s)$ obtained is multiplied by $W_1(s)$ to calculate the filter $K_{\mu 0}(s)$ of the calculating element B35.

An example of the filter $K_{\mu 0}(s)$ calculated in this way is shown in the next equation (15).

$$K_{\mu 0}(s) = \frac{N_{\mu 0}(s)}{D_{\mu 0}(s)}$$

$N_{\mu 0}(s) = 3.5232 \times 10^{14} s^{14} + 6.5122 \times 10^{6} s^{13}$ $+ 3.4334 \times 10^{8} s^{12} + 4.8069 \times 10^{9} s^{11}$ $+ 2.9640 \times 10^{10} s^{10} + 9.3282 \times 10^{10} s^{9}$ $+ 1.5345 \times 10^{11} s^{8} + 1.2406 \times 10^{11} s^{7}$ $+ 5.1195 \times 10^{10} s^{6}$ $+ 1.1092 \times 10^{10} s^{5} + 1.2861 \times 10^{9} s^{4} + 7.9213 \times 10^{7} s^{3}$ $+ 2.5077 \times 10^{6} s^{2} + 3.7009 \times 10^{4} s + 2.0110 \times 10^{2}$ $D_{\mu 0}(s) = s^{15} + 9.5530 \times 10^{3} s^{14} +$ $2.4931 \times 10^{6} s^{13} + 2.2938 \times 10^{8} s^{12} + 7.9892 \times 10^{9} s^{11}$ $+ 5.7592 \times 10^{10} s^{10} + 1.552 \times 10^{11} s^{9} +$ $1.5828 \times 10^{11} s^{8} + 7.4276 \times 10^{10} s^{7}$ $+ 1.7406 \times 10^{10} s^{6} + 2.1247 \times 10^{9} s^{5} +$ $1.3547 \times 10^{8} s^{4} + 4.3930 \times 10^{6} s^{7}$ $+ 6.5900 \times 10^{4} s^{2} + 3.6241 \times 10^{2} s \quad (15)$ The filter $K_{\mu 0}$ may comprise only a proportional term and an integral term as shown by the next equation (16), and coefficients $k_p$, $k_I$ which stabilize the closed-loop system against variation of the time constant $T_P$ and dead time $e^{-Ls}$ may be determined by $\mu$ analysis.

$$K_{\mu 0}(s) = \frac{k_p \cdot s + k_I}{s} \quad (16)$$

$$k_p = 0.6$$

$$k_I = 0.5$$

Regarding equation (15), a filter of dimensions lowered by zero pole cancellation, etc., may also be used as the filter $K_{\mu 0}$. In this case, $N_{\mu 0}$ and $D_{\mu 0}$ are set as follows.

$N_{\mu 0}(s) = 3.5232 \times 10^{4} s^{5} + 2.9117 \times 10^{6} s^{4} + 4.0688 \times 10^{7} s^{3} + 2.2479 \times 10^{8} s^{2} + 5.5866 \times 10^{8} s + 5.3734 \times 10^{8}$ $$D_{\mu 0}(s)=s^6+9.4564\times10^3 s^5+1.5797\times10^6 s^4+7.5474\times10^7 s^3+4.7536\times 10^8 s^8+8.4804\times10^8 s$$

Figure 12:
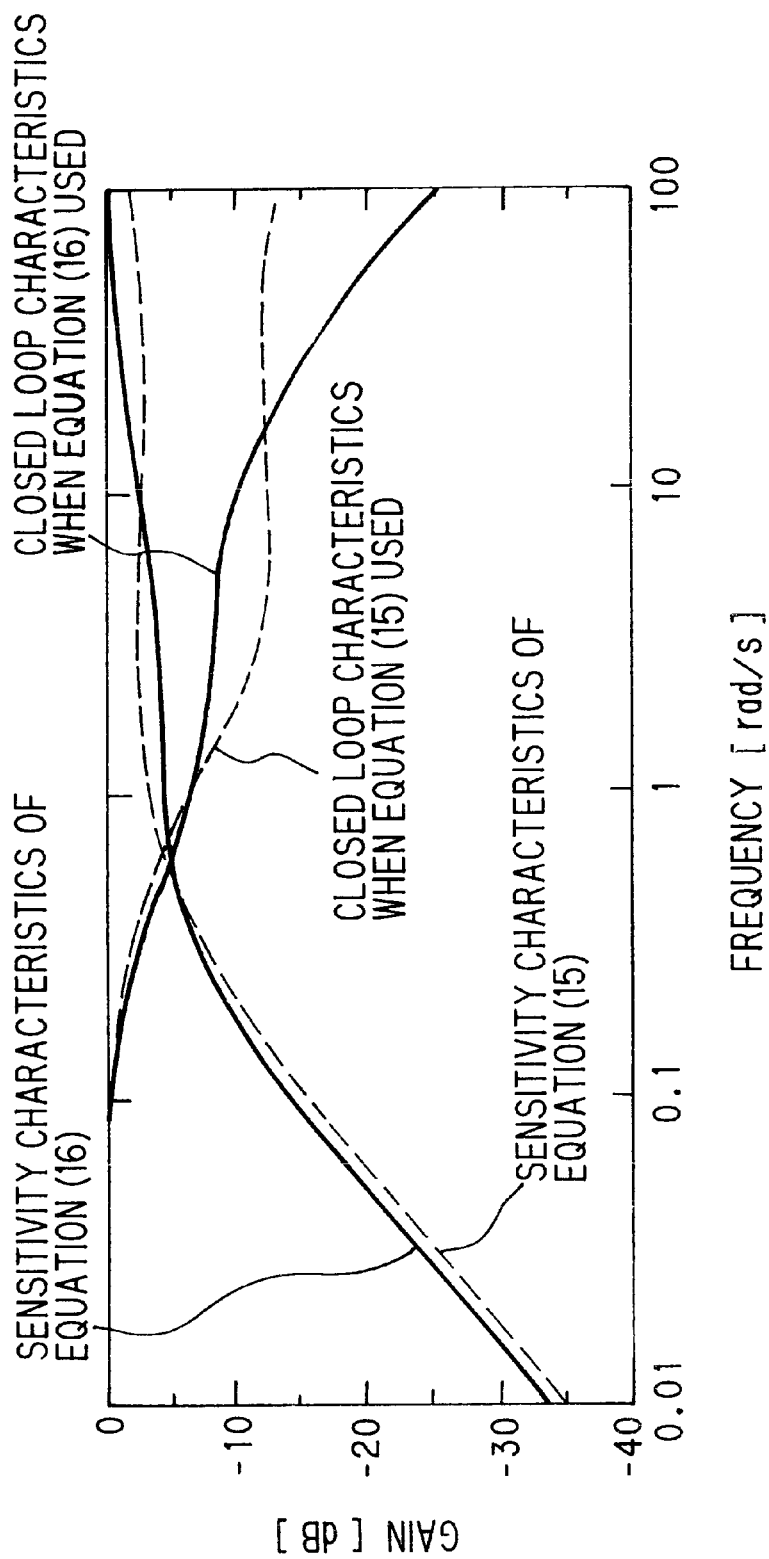
FIG. 12 is a bode diagram showing a sensitivity characteristic of a filter $K_{\mu 0}$, and the frequency characteristics of a feedback loop of a speed ratio control system.

FIG. 12 shows the sensitivity characteristics of the filter represented by the equation (15), and the filter represented by the equation (16), and the frequency characteristics of the closed loop of the speed ratio control system when these are used for the calculating element B35.

As shown in this figure, as the gain of sensitivity characteristics is small in the low frequency region for both filters, i.e., the filters have integrating characteristics, the effect of indeterminate elements on closed loop characteristics is suppressed low.

Regarding closed loop characteristics, on the low frequency side (less than 0.1[rad/sec]), the gain is 1 in order that a permanent difference does not arise between the transient target ratio and real speed ratio, and on the high frequency side (above 1[rad/sec]), the gain does not have a peak and is suppressed so that the effect of indeterminate elements is small.

The computing unit 35 passes the difference $i_{PERR}$ of the transient target ratio $i_{PM}$ and the real speed ratio $i_{PR}$ through the filter $K_{\mu 0}$ designed in this way, and computes the correction amount $i_{PFB}$ of the speed ratio command value $i_{PA}$. The adder/subtractor $P_2$ corrects the speed ratio command value $i_{PA}$ by the correction amount $i_{PFB}$, and computes the final speed ratio command value $i_{PCF}$.

$$i_{PCF}=i_A+i_{PFB} \tag{17}$$

This speed ratio command value $i_{PCF}$ is converted into the angular position command value $\theta_C$ in the converter B4, and is output to the step motor 2.

Figure 13:
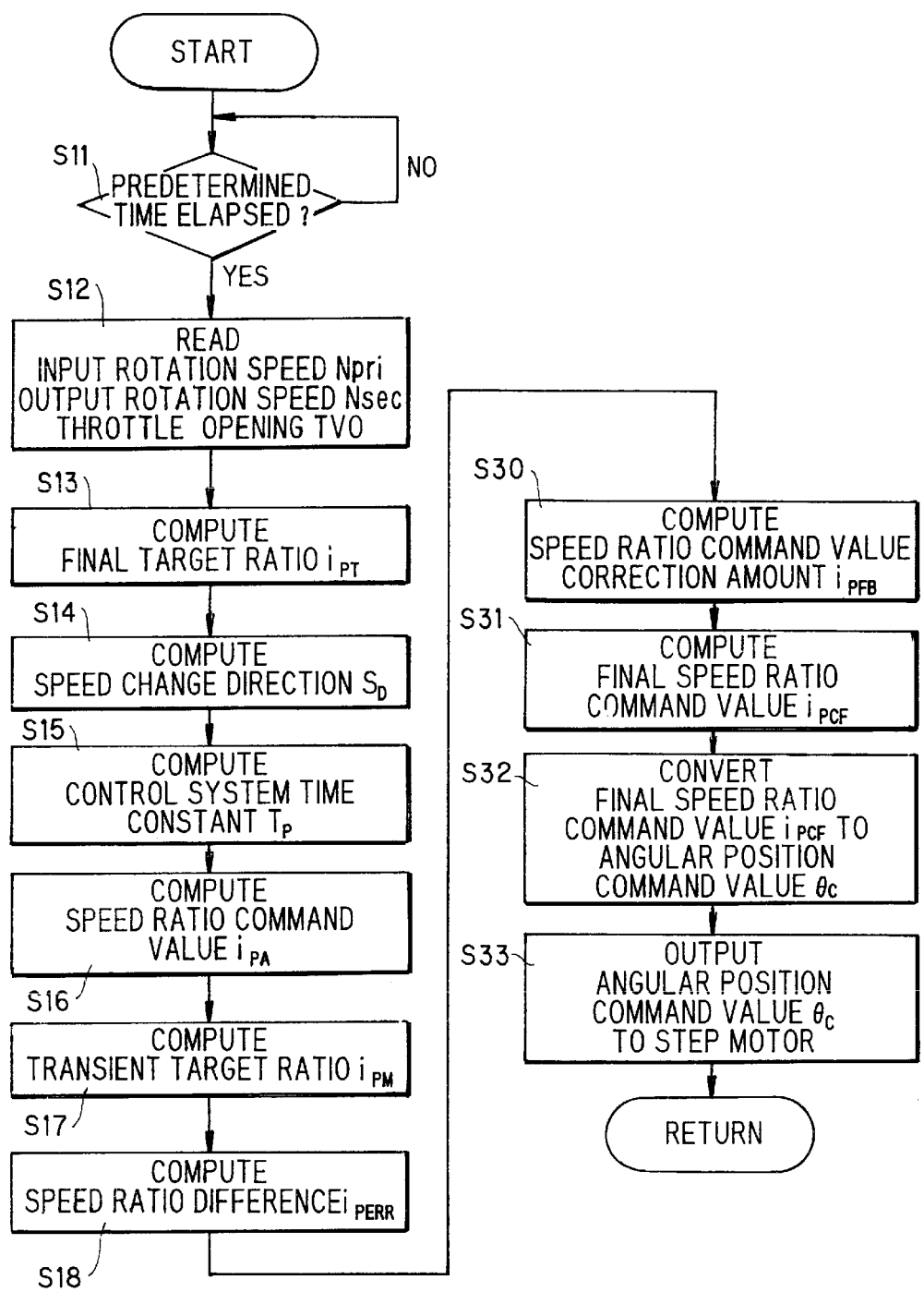
FIG. 13 is similar to FIG. 7, but is a flowchart showing the second embodiment.

Next, the processing of the CVT control unit 1 will be described referring to the flowchart of FIG. 13.

The processing up to the step S18 is the same as that of the first embodiment, only the processing after the step S30 being different.

In the step S30, the difference $i_{PERR}$ of the transient target ratio $i_{PM}$ and the real speed ratio $i_{PR}$ is passed through the filter $K_{\mu 0}$, and the correction amount $i_{PFB}$ is computed.

In a step S31, the speed ratio command value $i_{PA}$ is corrected by adding the correction amount $i_{PFB}$ to compute the final speed ratio command value $i_{PCF}$.

In a step S32, the speed ratio command value $i_{PCF}$ is converted to the angular position command value $\theta_C$ by looking up a predetermined map, and the angular position command value $\theta_C$ is output to the step motor 2 in a step S33.

Therefore, according to this second embodiment, the angular position of the step motor 2 is controlled so that the real speed ratio $i_{PR}$ of the speed change mechanism 17 approaches the final target ratio $i_{PT}$ with a predetermined dynamic characteristic. When a difference arises between the transient target ratio $i_{PM}$ and the real speed ratio $i_{PR}$ due to the drive speed limit of the step motor 2, etc., the speed ratio command value $i_{PA}$ is corrected based on the correction amount $i_{PFB}$.

Next, the effect of this second embodiment will be described by comparing with the first embodiment.

Figure 14:
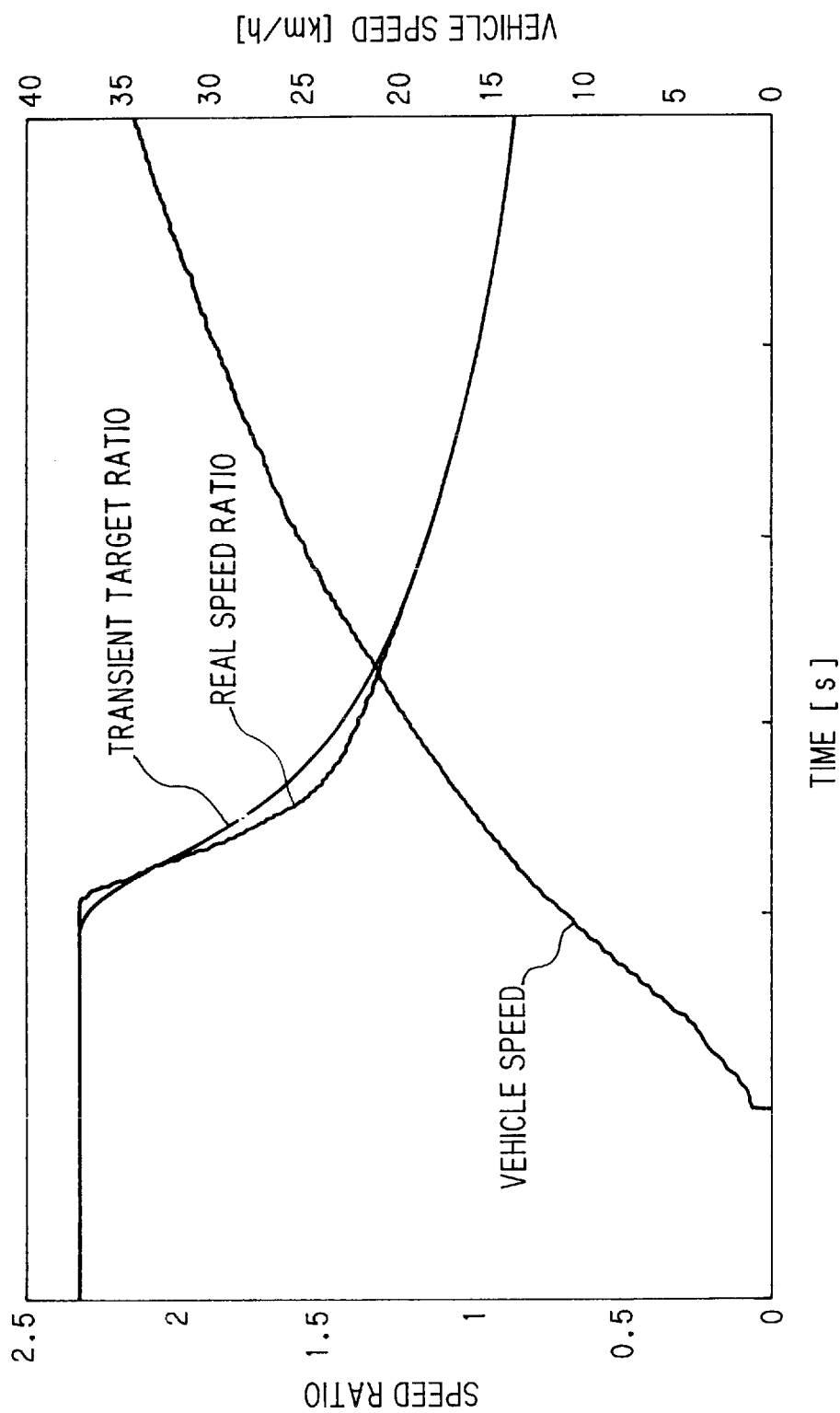
FIG. 14 is a figure showing the result when a vehicle accelerates from standstill using the speed ratio control system according to the first embodiment.
Figure 15:
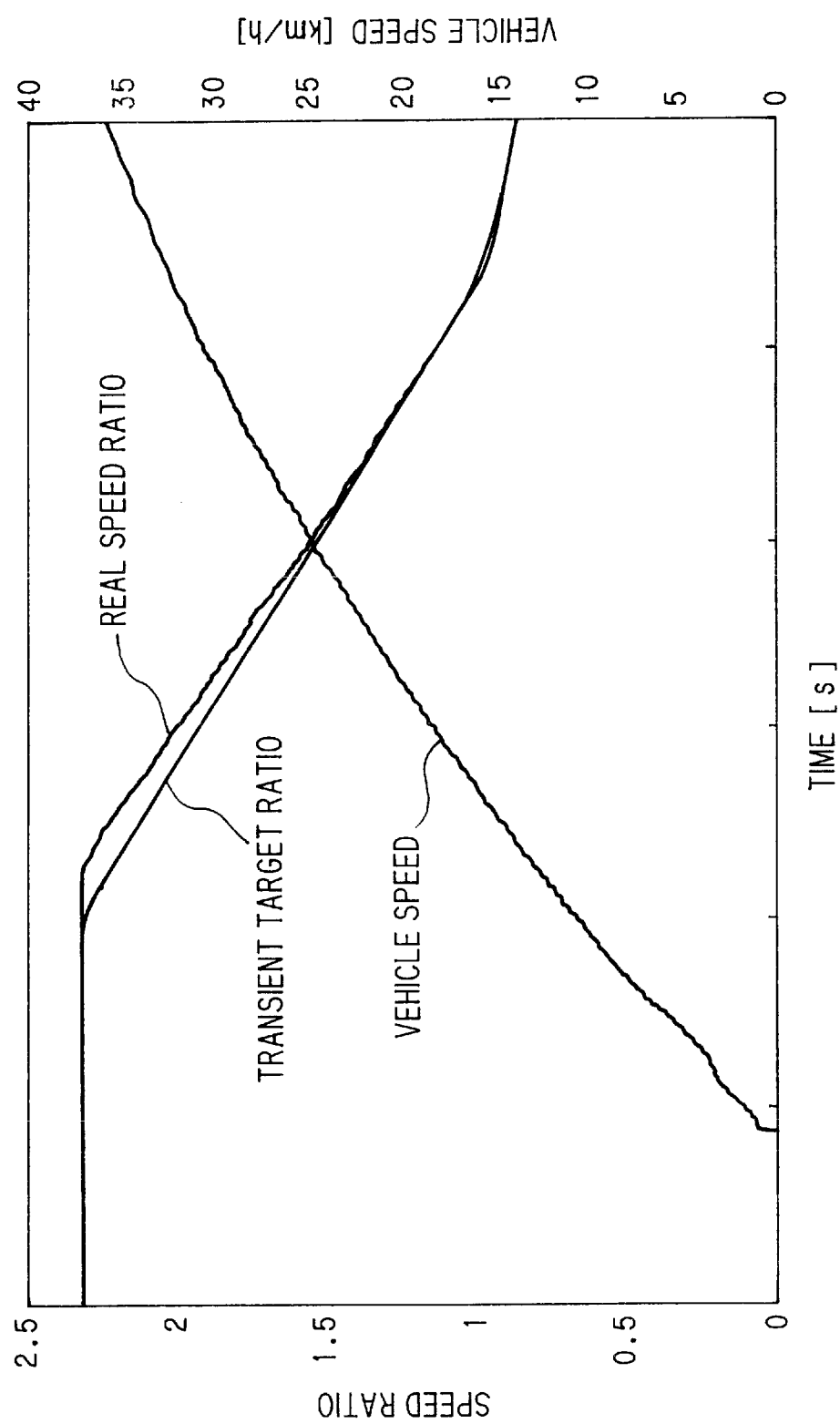
FIG. 15 is a figure showing the result when a vehicle accelerates from standstill using the speed ratio control system according to the second embodiment.

FIG. 14 and FIG. 15 show the result of vehicle acceleration from standstill using the speed ratio control system according to the first and second embodiments, respectively. In such a situation, as information regarding the real speed ratio, etc., is not stable, and the opening direction (speed change direction) of the speed change control valve cannot be known for certain, the time constant of the CVT 4 is often incorrectly estimated.

Therefore, in the speed ratio control system of the first embodiment, when the time constant is incorrectly estimated, the real speed ratio causes an overshoot, and the real speed ratio becomes smaller than the transient target ratio, as shown in FIG. 14.

On the other hand, in the speed ratio control system of the second embodiment, the real speed ratio can be made to follow the transient target ratio without causing an overshoot as shown in FIG. 15, even if the time constant representing the CVT 4 is incorrectly estimated. This is because the speed ratio control system of the second embodiment is constructed so that indeterminate elements do not enter the closed-loop system, and their effect is thereby suppressed.

Also in this second embodiment, when a difference arises between the transient target ratio and real speed ratio due to the drive speed limit of the step motor, etc., a correction can be applied to the output of the dynamic characteristic compensator B31 as in the first embodiment to reduce the difference of the speed ratio command value and real speed ratio.

Further, as the output of the calculating element B35 is added to the output of the dynamic characteristic compensator B31, the dynamic characteristic compensator B31 is not affected by the output of the calculating element B35. Thus, the speed ratio response and responsiveness to disturbances can be designed independently.

This invention has been described in the case of an embodiment applied to a speed ratio control system of a V-belt CVT, but the invention is not limited to this, and can be widely applied to speed ratio control systems which control a speed ratio using a step motor or the like. Further, the block diagram of the speed ratio control system is not limited to what is shown here, it being possible to apply the invention to any equivalent system.

As mentioned above, the speed ratio control system of this invention is useful as a speed ratio control system for CVT. When the operation of a speed ratio mechanism is limited, and a difference arises between a transient target ratio and a real speed ratio, this invention is suitable for reducing the difference and for achieving a desired speed ratio response.

The entire contents of Japanese Patent Applications P10-362403 (filed Dec. 21, 1998) and P11-353135 (filed Dec. 13, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A speed ratio control system of a continuously variable transmission, comprising:

a first compensator which computes a speed ratio command value based on a final target ratio determined according to a running state, a time constant representing a predetermined dynamic characteristic and a time constant representing an estimated dynamic characteristic of the transmission, a transient target ratio calculating element which computes a transient target ratio based on the final target ratio and the time constant representing the predetermined dynamic characteristic, a correction amount calculating element which computes a correction amount of the speed ratio command value based on the difference between the transient target ratio and a real speed ratio, and an adder/subtractor which corrects the speed ratio command value based on the correction amount, wherein:
the transmission is controlled based on the speed ratio command value after correction.

2. A speed ratio control system as defined in claim 1, comprising a second compensator which further corrects the speed ratio command value by a filter using approximate zeroing so that disturbances acting on the transmission are compensated.

3. A speed ratio control system as defined in claim 2, wherein the correction amount calculating element computes the correction amount of the speed ratio command value by passing the difference between the transient target ratio and real speed ratio through a function determined according to the time constant representing the dynamic characteristic of the transmission.

4. A speed ratio control system as defined in claim 1, wherein the correction amount calculating element computes the correction amount of the speed ratio command value by passing the difference between the transient target ratio and real speed ratio via a filter whereof the stability relative to variation of a time constant representing the dynamic characteristic of the transmission, is compensated.

5. A speed ratio control system as defined in claim 4, wherein the filter has an integrating characteristics.

6. A speed ratio control system as defined in claim 4, wherein the filter is designed so that the frequency characteristics of a closed loop control system comprising the correction amount computing element and the transmission have a gain of 1 in the low frequency region, and have no gain peak in the high frequency region.

7. A speed ratio control system as defined in claim 4, wherein the filter is designed using a generalized controlled system including the variation of the time constant representing the dynamic characteristic of the transmission.

8. A speed ratio control system as defined in claim 4, wherein the filter is designed using a generalized controlled system including a dead time of the dynamic characteristic of the transmission.

9. A speed ratio control system as defined in claim 4, wherein, when there is a dead time in the dynamic characteristic of the transmission, the transient target ratio calculating element computes the transient target ratio taking account of a lag corresponding to the dead time.

10. A speed ratio control system as defined in claim 1, wherein the first compensator computes the speed ratio command value by passing the final target ratio via a filter which is obtained by multiplying the inverse of a transmission function representing a dynamic characteristic of the transmission by a transmission function representing the predetermined dynamic characteristic.

11. A speed ratio control system as defined in claim 1, wherein the first compensator computes the speed ratio command value by passing the final target ratio via a first order/first order filter expressed by $$G_{TC} = \frac{T_P \cdot s + 1}{T_T \cdot s + 1}$$

$T_P$=time constant representing a dynamic characteristic of the transmission and $T_T$=time constant representing the predetermined dynamic characteristic.

12. A speed ratio control system of a transmission, comprising a microprocessor programmed to:

compute a speed ratio command value based on a final target ratio determined according to a running state, a time constant representing a predetermined dynamic characteristic and a time constant representing an estimated dynamic characteristic of the transmission, compute a transient target ratio based on the final target ratio and the time constant representing the predetermined dynamic characteristic, compute a correction amount of the speed ratio command value based on the difference between the transient target ratio and real speed ratio, and correct the speed ratio command value based on the correction amount, wherein:
the transmission is controlled based on the speed ratio command value after correction.

13. A speed ratio control system as defined in claim 12, wherein the microprocessor is further programmed to further correct the speed ratio command value by a filter using approximate zeroing to compensate for disturbances acting on the transmission.

14. A speed ratio control system as defined in claim 12, wherein the microprocessor is further programmed to compute a correction amount of the speed ratio command value by passing the difference between the transient target ratio and real speed ratio of via a filter whereof the stability relative to variation of a time constant representing a dynamic characteristic of the transmission, is compensated.

15. A speed ratio control system of a continuously variable transmission, comprising:

means for computing a speed ratio command value based on a final target ratio determined according to a running state, a time constant representing a predetermined dynamic characteristic and an estimated time constant representing a dynamic characteristic of the transmission, means for computing the transient target ratio based on the final target ratio and the time constant representing the predetermined dynamic characteristic, means for computing a correction amount of the speed ratio command value based on the difference between the transient target ratio and real speed ratio, and means for correcting the speed ratio command value based on the correction amount, wherein:
the transmission is controlled based on the speed ratio command value after correction.

16. A speed ratio control system as defined in claim 15, further comprising means for correcting the speed ratio command value by a filter using approximate zeroing to correct for disturbances acting on the transmission.

17. A speed ratio control system as defined in claim 15, wherein the means for computing the correction amount of the speed ratio command value computes the correction amount of the speed ratio command value by passing the difference between the transient target ratio and real speed ratio via a filter whereof the stability relative to variation of a time constant representing the dynamic characteristic of the transmission, is compensated.

* * * * *